Dec. 5, 1933.  E. R. COX  1,937,871
RECOVERY OF GASOLINE FROM NATURAL GAS
Filed Sept. 15, 1930
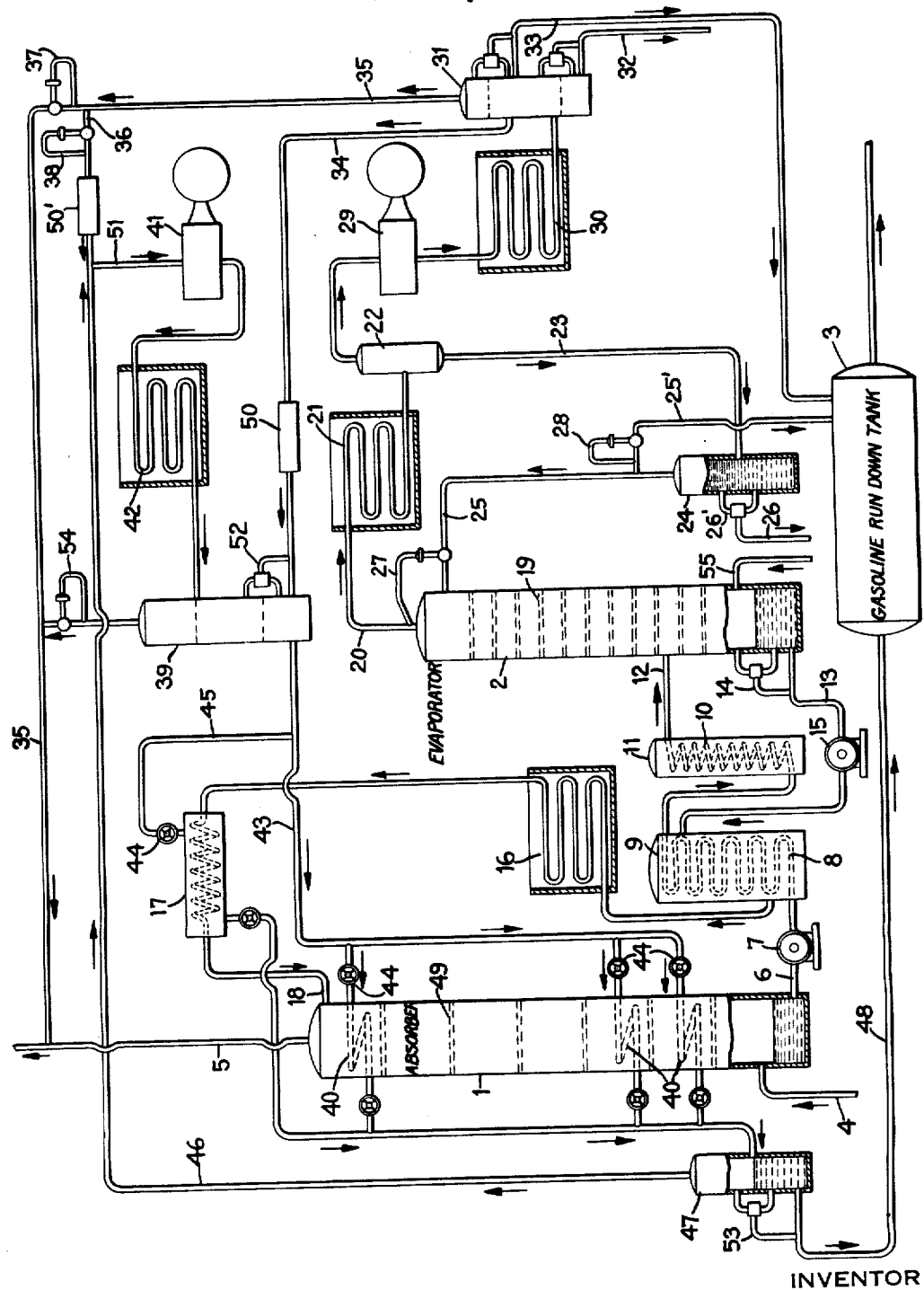
INVENTOR
Edwin R. Cox
BY ATTORNEY
R. J. Dearborn Patented Dec. 5, 1933

1,937,871

UNITED STATES PATENT OFFICE 1,937,871

RECOVERY OF GASOLINE FROM NATURAL GAS

Edwin R. Cox, Los Angeles, Calif., assignor to The Texas Company, New York, N. Y., a corporation of Delaware Application September 15, 1930
Serial No. 482,000

11 Claims. (Cl. 196—8)

My invention relates to the recovery of gasoline from natural gas by absorption in an absorbent oil and has to do particularly with a method of cooling the absorbent oil in an absorber. It also comprises an improved method of obtaining refrigeration in an absorption plant and various other improvements and modifications in the process and apparatus hereinafter to be more fully described and claimed.

In the recovery of gasoline from natural gas by absorption in a liquid, it is customary to pass the wet gas containing a substantial amount of gasoline into an absorption tower wherein the gas is scrubbed by contact with a suitable absorbent such as mineral seal. As the oil absorbs the gasoline, its temperature rises due to the latent heat of condensation of the absorbed vapors. This rise in temperature becomes an important factor when a rich gas is treated and usually calls for cooling the absorbent oil.

The customary method of cooling the absorbent oil has been to pass the oil in heat exchange with a suitable refrigerant prior to the entrance of the oil into the absorber. This method effectively cools the absorbent oil, but the temperature of the products inside the absorber is dependent entirely on the degree of cooling of the absorbent oil outside the zone of absorption. My invention comprises a method whereby the heat is removed as it is generated within the absorber and particularly at or near the point where it is generated by the release of latent heat of vaporization of the gasoline absorbed. This is done as will hereinafter be described, by installing cooling coils directly inside the absorber and located at points of maximum heat transfer.

According to my improved method of applying the cooling medium, any refrigerant might be used, such as ammonia, sulphur-dioxide, or brine. However, my invention also comprises improvements in securing refrigeration by a refrigerant consisting of a mixture of ethane, propane, isobutane, normal butane and traces of lighter and heavier hydrocarbons, the whole mixture approximating the characteristics of propane. This is obtained in an average absorption plant as a regular part of the process. By using such a refrigerant as just indicated in a refrigerating system, the character of the working medium might change and I have devised a means by which the quantity and quality of the working medium may be kept constant and this also forms a part of my invention.

The advantages of my system of obtaining refrigeration in connection with an absorption plant over other systems such as those previously mentioned are numerous. For example, leaks of refrigerants such as ammonia or sulphur-dioxide are disagreeable and sometimes dangerous and often cause interruption of service. The cost of charging systems with such materials is considerable, and they must be frequently purged to maintain uniform operation. Other systems also require special machinery. My system, on the other hand, requires no offensive or dangerous working medium. The quality is maintained continuously and automatically constant without cost, and no special equipment is necessary.

For the purpose of describing the invention in detail, reference is made to the accompanying drawing, which is a diagrammatic elevation partly in section of an apparatus suitable for carrying out the invention.

Referring to the drawing, the absorption plant comprises an absorber 1, an evaporator 2, a gasoline run-down tank 3, and suitable connections therebetween. The absorber 1 is equipped with a wet gas inlet 4 at the base thereof, and an exit 5 at the top for dry gas. The rich absorbent oil is drawn from the bottom of the absorber through the line 6, in which is provided a pump 7. The pump 7 forces the rich oil through coil 8 in heat exchanger 9, thence through coil 10 in preheater 11, and finally through pipe 12 into the evaporator 2. In the evaporator the gasoline is distilled off from the absorbent oil, and the lean absorbent oil withdrawn from the bottom thereof through the line 13, in which is interposed an automatic float valve mechanism 14 for controlling the liquid level in the evaporator. The pump 15 picks up the lean oil, forcing it through heat exchanger 9, cooling coil 16, refrigerating coil 17 and finally through pipe 18 into the top of absorber 1.

The evaporator 2 is equipped with baffles 19 and the upper section constitutes a fractionating tower for separating the gasoline constituents from the absorbent oil. The light gasoline like vapors are passed through pipe 20 and the partial condenser 21 into a separator 22. The heavier constituents of the vapors which have been condensed in partial condenser 21 are separated from the uncondensed vapors in separator 22, and the condensate passed through line 23 to an accumulator 24. In the latter, water settles and is drained off via pipe 26, controlled by automatic water level regulator 26'. The gasoline condensate is delivered from accumulator 24 by pipe 25, a portion of it passing to the fractionating tower to act as a reflux and the remainder passing to run-down tank 3 through branch line 25', the relative proportions which pass to the fractionating tower and run-down tank respectively being controlled by temperature regulating mechanism 27 and back-pressure valve 28.

The uncondensed vapors from separator 22 are compressed in compressor 29, cooled in condenser 30 and the condensate separated from the light uncondensed vapors in separator 31. The latter is equipped with water drain 32, condensate lines 33, 34, and vapor line 35. The condensate may be passed through line 33 to the run-down tank 3, or through line 34 to a compression refrigeration system hereinafter described. The uncondensed vapors and gases pass through line 35 either to the dry gas line 5 or through pipe 36 to the compression refrigeration system, suitable back-pressure valves, 37 and 38, controlling the flow of the product through the respective lines.

The refrigeration system previously referred to is the familiar compression type and comprises a reservoir 39 for holding the working medium, expansion or refrigerating coils 40 located in absorber 1, compressor 41, and cooler or condenser 42. The working medium is drawn from reservoir 39 through line 43 and expanded through expansion valves 44 and refrigerating coils 40. A branch line 45 leading from line 43 may convey a portion of the working medium to be used around coil 17 as a refrigerant for the lean absorbent oil. After passing through the refrigerating coils, the working medium is substantially all in the form of vapor, which is passed by line 46 to compressor 41. Between the line 46 and the refrigerating coils 40, is located an accumulator 47 for receiving the heavy unvaporized portions of the working medium. In case products from the absorption plant are used as a working medium, the liquid accumulating in 47 is of the nature of gasoline, which can be conveniently drained through pipe 48 to run-down tank 3. The expanded vapors from line 46 are compressed by compressor 41, cooled in condenser 42 and the product returned to reservoir 39 to be recycled as a working medium.

The refrigerating coils 40 in absorber 1 are installed directly above one or more of the absorption trays 49 so as to be immersed in the oil above the trays. These trays consist of perforated plates and the gas bubbles up through the perforations at a fairly high velocity, violently agitating the oil above the trays. Hence the heat transfer rate is quite high, and furthermore, the coils, by being located directly above the trays, remove the heat at or near the point where it is generated by the release of latent heat of condensation of the gasoline absorbed. I have found that most of the absorption takes place at the top or bottom of an absorber and that at the top mainly light fractions are absorbed and at the bottom mostly the heavier fractions. The function of the intermediate trays is chiefly to afford means for the gradual replacement of light fractions by heavier as the oil travels downward. Therefore, as illustrated in the drawing, it is often necessary to cool only the top and bottom of the absorber. At the bottom of the absorber, I prefer to install cooling coils above the two bottom trays. At the top, coils may be installed above the top tray, or the top two trays, or the oil may be cooled in coil 17 before entering the absorber.

While I have shown coils 40 diagrammatically as only a single coil above certain selected trays, it is understood that a number of such coils may be placed above a single tray. Obviously other arrangements of the coils might be made without departing from the spirit of the invention.

The refrigerant adapted to be used in the apparatus shown in the drawing is a mixture of light hydrocarbons obtained in the absorption plant as a regular part of the process. With the apparatus described, it is collected in separator 31. The liquid portion is passed through line 34 and the dehydrator 50 to the reservoir 39, where a supply of refrigerant constant in quantity and quality is automatically maintained as will now be described.

If the total refrigerant is deficient in quantity and the deficiency is in light fractions, the pressure at the suction side of recompressor 41 will drop, the pressure-reducing valve 38 will open and light hydrocarbons from line 35 will pass through valve 38, dehydrator 50' and pipe 51 to the recompressor to restore the pressure. If the deficiency is in heavy fractions, the liquid level in reservoir 39 will drop, float valve 52 will open, and liquid from separator 31 will be admitted to restore the proper volume. In case there is an excess in quantity and the excess lies in heavy fractions, the float valve in accumulator 47 will open and the excess will be released to the run-down tank 3 via pipe 48. Should the excess be light fractions the pressure will rise, the back-pressure valve 54 will open, releasing gas from the top of reservoir 39 to the gas line 35.

On the other hand, if the quality is not correct, for example, the working medium is not sufficiently volatile, it will not all vaporize and the liquid will accumulate in accumulator 47 from whence it will be released to the run-down tank 3. The loss in volume will then be made up by additions of light or heavy fractions through lines 34 or 35 from separator 31 as previously described. If the refrigerant is too volatile, it will not all condense in coil 42, the level in 39 will drop until float valve 52 opens thereby admitting more liquid from tank 31 to restore the proper volume. The resulting excess in quantity of gaseous constituents will then be released through back pressure valve 54.

The operation of the apparatus described and shown in the drawing is as follows: Wet gas containing ½ to 5 gals. of gasoline per 1000 cu. ft. is passed through line 4 into the absorber 1. The gas bubbles up through the perforated trays 49, causing violent agitation of the absorbent oil which enters through line 18 and flows down over the trays. As the oil absorbs the gasoline vapors, there is a rise in temperature and I have shown refrigerating coils 40 directly above selected trays to remove the heat at or near the point where it is generated by the latent heat of condensation. The rich absorbent oil at about 50° F. is pumped by pump 7 through heat exchanger 9, wherein the temperature is raised to about 270° F. due to the exchange of heat with the hot lean oil. The rich oil is then passed to preheater 11, where the temperature is elevated to about 360° F. before the oil enters the evaporator. A pressure of approximately 25 lbs. per square inch is maintained on the evaporator 2. In the evaporator the gasoline content of the absorbent oil is removed in the form of vapors and a lean oil, substantially free from light hydrocarbons, collects at the bottom. If desired, steam may be introduced through pipe 55 to aid in stripping the absorbent oil. The liquid level at the bottom of the evaporator is maintained constant by float valve 14. The lean oil at about 350° F. is withdrawn through pipe 13 and forced by pump 15 to heat exchanger 9. In passing through the heat exchanger, the lean oil drops in temperature to approximately 120° F. In the cooler 16, the temperature is further reduced to about 80° F. and in the refrigerating coil 17, it is finally reduced to about 40° F. before it enters the absorber.

In the fractionating tower at the top of evaporator 2, the vapors are fractionated so that substantially no absorbent oil passes over with the gasoline vapors to condenser 21. To aid the fractionation, a portion of the gasoline distillate may be returned through line 25 as a reflux to the top of the tower. In practice the quantity of reflux may be controlled automatically by the thermostatic mechanism 27 located at the top of the tower.

The heavier fractions of the vapors are condensed in the partial condenser 21 and a condensate suitable for the manufacture of gasoline is collected in separator 22. The condensate, separated from uncondensed vapors, is delivered through pipe 23 to accumulator 24. Water is drained from the accumulator by pipe 26 and the excess condensate over that used as a reflux in the fractionating tower is sent to the run-down tank 3 via pipe 25'.

The uncondensed vapors from separator 22 frequently contain as high as 30 per cent of the total recoverable gasoline. They are compressed in compressor 29 to about 175 lbs. per square inch to recover this gasoline. After passing through condenser 30, separation is effected in separator 31 from which water is drained by pipe 32 and the uncondensed gases and vapors vented through line 35 to the dry gas line 5 or used for refrigeration as previously indicated.

The condensate in separator 31 as heretofore described is a mixture of the nature of propane. It may be passed to the gasoline run-down tank 3, or delivered through pipe 34 and dehydrator 50 to the refrigeration system. This condensate is delivered to the refrigeration system at about 80° F. and 150 lbs. pressure per square inch and constitutes a suitable refrigerant. It is expanded into the cooling coils 40 through valves 44 to about 60 lbs. pressure. The heavy unvaporized material accumulates in tank 47 and is drawn off to the run-down tank 3 through float controlled valve 53. The vapors at about 35° F. and 60 lbs. pressure are conducted through line 46 to recompressor 41 and condenser 42, wherein they are again liquefied and returned to reservoir 39. It will be noted that the cycle consisting of expansion in coils 40, recompression in compressor 41 and condensation in condenser 42, comprises a compression refrigeration system. The working medium is maintained in reservoir 39 from which excess gases may be released through back-pressure valve 54.

The working medium in reservoir 39 is automatically kept constant in quantity and quality by addition of selected portions from the product of compressor 29. The selected portions may be liquid from separator 31 or uncondensed vapors from pipe 35. The method of automatic control of the quantity and quality of the working medium in the refrigeration system has been fully described heretofore in connection with the description of the apparatus.

Modification and variations of the disclosure will be apparent to those skilled in the art, and therefore I do not wish to limit myself to any particular detail, parts and features, but only to the scope of the appended claims.

I claim:

1. A method of recovering gasoline from natural gas which comprises passing natural gas containing a substantial amount of gasoline into an absorption zone wherein the gasoline is absorbed in an absorbent oil, releasing substantially gasoline free gas from said absorption zone, passing absorbent oil relatively rich in gasoline from said absorption zone to an evaporating zone, vaporizing the gasoline-like constituents of the rich oil in said evaporating zone, partially condensing the resultant vapors to separate the heavier gasoline-like constituents, compressing the uncondensed vapors to form a bulk supply of a refrigerant comprising the lighter condensable hydrocarbons, charging a portion of the bulk supply as a working medium to a compression refrigerating system, cooling the absorbent oil by said refrigerating system, maintaining the working medium in said refrigerating system substantially constant in quantity and quality by supplying thereto selected fractions of said bulk supply and withdrawing constituents undesirable as a working medium from said refrigerating system.

2. A method of recovering gasoline from natural gas which comprises passing natural gas containing a substantial amount of gasoline into an absorption zone wherein the gasoline is absorbed in an absorbent oil, releasing substantially gasoline free gas from said absorption zone, passing absorbent oil relatively rich in gasoline from said absorption zone to an evaporating zone, vaporizing the gasoline-like constituents of the rich oil in said evaporating zone, partially condensing the resultant vapors to separate the heavier gasoline-like constituents under pressure, compressing the lighter constituents of the vapors to produce a product suitable for a refrigerant consisting of a condensate and an uncondensed vapor, charging said refrigerant as a working medium to a compression refrigeration system, cooling the absorbent oil by indirect heat exchange with said refrigerant, maintaining the working medium in said refrigerating system substantially constant in quantity and quality by supplying thereto selected portions of said refrigerant, and withdrawing constituents unsuitable as a working medium from said refrigerating system.

3. An apparatus for recovering gasoline from natural gas comprising an absorber, an evaporator, means for delivering rich oil from the absorber to the evaporator, a compressor, a vapor line connecting said evaporator with the compressor, means in said vapor line to partially condense and collect a gasoline distillate from the vapors therein, a receiver connected to said compressor to collect a bulk supply of refrigerating medium, a compression refrigerating system for cooling the absorbent oil in the absorber by circulating said medium in indirect heat exchange with the absorbent oil, said refrigerating system including a compressor, a cooler and an expansion coil, and means for supplying the refrigerating medium from said bulk supply as a working medium to the refrigerating system.

4. An apparatus for recovering gasoline from natural gas comprising an absorber, an evaporator, means for delivering rich oil from the absorber to the evaporator, a compressor, a vapor line connecting said evaporator with the compressor, means in said vapor line to partially condense and collect a gasoline distillate from the vapors therein, a receiver connected to said compressor, a compression refrigerating system including a compressor, a cooler and an expansion coil for cooling the oil in the absorber, a connection between the receiver and the refrigerating system, a mechanism in said connection for automatically controlling the supply of liquid refrigerant to said refrigerating system in response to the volume of working medium therein, and means for withdrawing gases from said refrigerating system.

5. An apparatus for recovering gasoline from natural gas comprising an absorber, an evaporator, means for delivering rich oil from the absorber to the evaporator, a compressor, a vapor line connecting said evaporator with the compressor, means in said vapor line to partially condense and collect a gasoline distillate from the vapors therein, a receiver connected to said compressor, a compression refrigeration system to cool the oil in the absorber, said refrigerating system including a compressor, a cooler, and an expansion coil, a connection between said receiver and the refrigeration system for delivering uncondensed vapors to said refrigeration system, a mechanism in said connection for automatically controlling the supply of vapor to the refrigerating system in response to the pressure on the suction of the compressor of said refrigerating system, and means for withdrawing liquids from the refrigerating system.

6. An apparatus for recovering gasoline from natural gas comprising an absorber, an evaporator connected to said absorber for distilling the gasoline-like constituents from the rich absorbent oil, a compressor, means for connecting the compressor with the evaporator including a condenser and receiver for recovering a gasoline distillate, means connected to said compressor for separating a distillate suitable for a refrigerant from uncondensed vapors, a compression refrigerating system including a compressor, a cooler and an expansion coil to cool the absorbent oil in the absorber, means automatically controlled in response to the volume of working medium in said refrigerating system for delivering said refrigerant to said refrigerating system, means automatically controlled in response to the pressure on the suction of the compressor of the refrigerating system for delivering said uncondensed vapors to the refrigerating system, and means for withdrawing selected portions of the working medium from the refrigerating system.

7. In a process for the recovery of gasoline from natural gas wherein the gasoline-like constituents are separated from the gas by absorption in a cool liquid absorption medium and the gasoline-like constituents distilled from the resultant rich absorbent, the improvement which comprises separating the constituents distilled from the rich absorbent into a heavier fraction containing gasoline constituents and a lighter fraction of the nature of propane consisting of vapors and condensate, charging a portion of said lighter fraction to a refrigerating system including compression, cooling and expansion means, wherein said fraction is circulated continuously as a working medium for cooling said liquid absorption medium and maintaining the working medium in said refrigerating system of the desired quantity and quality by intermittently supplying thereto additional selected portions of said lighter fraction, and withdrawing undesirable portions of the working medium from said refrigerating system.

8. In the recovery of gasoline from natural gas, the process that comprises absorbing the gasoline-like constituents from the gas in an absorbent oil, separating the absorbed constituents as vapors from the resultant rich absorbent by distillation, fractionally condensing under pressure the vapors to produce a gasoline fraction, a lighter-than-gasoline fraction and uncondensed vapors, charging a portion of said lighter-than-gasoline fraction to a refrigerating system, continuously circulating said fraction in the refrigerating system as a refrigerant to cool the absorbent oil by indirect heat exchange therewith, withdrawing from said refrigerating system any uncondensable constituents unsuitable for the refrigerant and maintaining the desired volatility of the refrigerant in the refrigerating system by adding thereto additional quantities of said fraction lighter than gasoline.

9. The process according to claim 8 in which the addition of refrigerant and the withdrawal of liquid constituents from the refrigerating system is controlled automatically in response to the volume of refrigerant in said system.

10. In the recovery of gasoline from natural gas, the process that comprises absorbing the gasoline-like constituents from the gas in an absorbent oil, separating the absorbed constituents as vapors from the resultant rich oil by distillation, fractionally condensing under pressure the vapors to produce a gasoline fraction, a condensate lighter than gasoline, of the nature of propane, and uncondensed vapors, charging the propane-like condensate to a refrigerating system, continuously circulating said condensate in the refrigerating system as a refrigerant for cooling by indirect heat exchange the absorbent oil, adding said uncondensed vapors to the refrigerating system to maintain the desired volatility of the refrigerant and releasing undesirable heavy constituents from the refrigerating system.

11. A process according to claim 10 in which the addition of uncondensed vapors to and the release of heavy constituents from the refrigerating system are controlled automatically in response to the volatility of the refrigerant.

EDWIN R. COX.